(12) United States Patent
Legagneux et al.

(10) Patent No.: US 7,214,553 B2
(45) Date of Patent: May 8, 2007

(54) PROCESS FOR THE LOCALIZED GROWTH OF NANOTUBES AND PROCESS FOR FABRICATING A SELF-ALIGNED CATHODE USING THE NANOTUBE GROWTH PROCESS

(75) Inventors: Pierre Legagneux, Le Mesnil St Denis (FR); Gilles Pirio, Paris (FR); Didier Pribat, Sevres (FR); William Ireland Milne, Newmarket (GB); Kenneth Boh Khin Teo, Cambridge (GB)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/490,300

(22) PCT Filed: Sep. 20, 2002

(86) PCT No.: PCT/FR02/03228

§ 371 (c)(1),
(2), (4) Date: Mar. 19, 2004

(87) PCT Pub. No.: WO03/025966

PCT Pub. Date: Mar. 27, 2003

(65) Prior Publication Data

US 2004/0240157 A1    Dec. 2, 2004

(30) Foreign Application Priority Data

Sep. 20, 2001 (FR) .................................. 01 12222

(51) Int. Cl.
*H01L 21/00* (2006.01)
(52) U.S. Cl. .................. 438/20; 361/516; 257/E23.025
(58) Field of Classification Search .................. 438/20, 438/660; 361/516; 977/842
See application file for complete search history.

(56) References Cited

U.S. PATENT DOCUMENTS

| 5,262,348 A | 11/1993 | Pribat et al. |
| 5,356,510 A | 10/1994 | Pribat et al. |
| 5,360,754 A | 11/1994 | Pribat et al. |
| 5,581,146 A | 12/1996 | Pribat et al. |
| 5,872,422 A | 2/1999 | Beetz et al. |
| 6,062,931 A | 5/2000 | Wang et al. |
| 6,356,028 B1 | 3/2002 | Legagneux et al. |
| 6,476,408 B1 | 11/2002 | Legagneux et al. |
| 6,538,367 B1 * | 3/2003 | Choi et al. .................. 313/309 |

FOREIGN PATENT DOCUMENTS

| EP | 0 913 508 A | 5/1999 |
| EP | 1 129 990 A | 9/2001 |

* cited by examiner

Primary Examiner—Michael Lebentritt
(74) Attorney, Agent, or Firm—Lowe Hauptman & Berner, LLP

(57) ABSTRACT

The invention relates to a process for the controlled growth of nanotubes or nanofibers on a substrate, characterized in that it furthermore comprises the production, on the substrate (11), of a bi-layer structure composed of a layer of catalyst material (71), for catalyzing the growth of nanotubes or nanofibers, and a layer of associated material, said associated material being such that it forms a noncatalytic alloy with the catalyst material at high temperature.

The invention also relates to a process for fabricating a field-emission cathode using the above nanotube or nanofiber fabrication process.

These processes allow very precise positioning of the catalyst spots from which the nanotubes and nanofibers can be grown and allow the fabrication of cathodes for which the nanotubes or nanofibers are self-aligned with the aperture in the extraction grid.

Applications: electron tubes, nanolithography.

21 Claims, 7 Drawing Sheets

PROCESS FOR THE LOCALIZED GROWTH OF NANOTUBES AND PROCESS FOR FABRICATING A SELF-ALIGNED CATHODE USING THE NANOTUBE GROWTH PROCESS

BACKGROUND OF THE INVENTION

1. Field of the Invention

The field of the invention is that of nanotubes or nanofibers that may be of the carbon, silicon or boron type or made of any other alloy based on at least one of these components (for example SiC) and possibly containing nitrogen (SiN, BN, SiCN). Typically, these nanotubes or nanofibers have diameters ranging from a few nanometers to a few hundred nanometers over several microns in height and constitute field-emission supertips, being characterized by very high electric field amplification factors.

They are particularly beneficial in field emission devices and especially in the fabrication of field-emission cathodes used as cold electron sources, which have many applications (electron tubes, ion motors, electron microscopy, nanolithography, flat display devices, etc.).

2. Description of Related Art

Conventionally, nanotubes or nanofibers are produced by growing them from catalyst spots very small in size. The use of nanotubes or nanofibers in field-emission devices generally requires the location of each nanotube or nanofiber to be controlled. To do this, the conventional method consists in making submicron (preferably of the order of 100 nm) apertures in a resin and then in depositing the catalyst as a thin film (with a thickness of less than about 10 nm).

After the step of dissolving the resin, catalyst spots having a diameter equivalent to the diameter of the apertures in the resin are then obtained. The application of this method to the fabrication of field-effect cathodes is illustrated in FIG. 1. A field-effect cathode generally comprises the following stack, illustrated in FIG. 1a: a substrate 1, a conducting layer 2, a diffusion barrier 3 (to prevent the catalyst from diffusing into the substrate), an insulator 4 and a conducting film corresponding to the electron extraction grid 5.

A second step consists in making apertures of the order of 100 nm in a resin 6 that is deposited on the stack illustrated in FIG. 1a, then in anisotropically etching the grid and isotropically etching the insulation, by chemical means (FIG. 1b).

The third step then consists in evaporating a catalyst 7 from a source S so as to deposit a catalyst spot in a self-aligned manner with respect to the aperture in the extraction grid.

This process is very suitable if the evaporation source S, which is of small extent (of the order of 1 cm), the aperture in the grid and the aperture in the insulation are aligned (FIG. 1c, right-hand feature). When this is not the case (FIG. 1c, left-hand feature), the catalyst spot is not centered in the cathode and consequently the nanotube or nanofiber grown from this catalyst spot cannot also be aligned.

After having carried out the lift-off operation in order to remove the resin 6 and the excess catalyst 7 (FIG. 1d), the process of growing the nanotubes 8 or nanofibers is carried out (FIG. 1e).

Nanotube or Nanofiber Growth Step

The preparation methods are the following: electrical discharge, pyrolysis, physical methods such as laser ablation and chemical methods such as CVD (chemical vapor deposition) or PECVD (plasma-enhanced CVD).

The method that seems best suited to the field-emission cathode application is the PECVD method, which is assisted by DC plasma, RF (radiofrequency) plasma or microwave plasma. This method allows nanotubes or nanofibers to be obtained that are oriented perpendicular to the substrate.

The nanotubes or nanofibers shown in all the figures of the patent have been drawn schematically.

For example in the case of carbon nanotubes (FIG. 1f), the catalyst particle has an elongate shape and a thin carbon film encapsulates this particle. In addition, unlike nanofibers, nanotubes are hollow.

The diameter of the nanotubes/nanofibers is smaller than the diameter of the catalyst spot, since the size of a catalyst aggregate is smaller than that of the spot and, after growth, the catalyst particle generally assumes an elongate shape.

It is thus apparent that the cathode on the right is operational, whereas that on the left will generate a short circuit. The case illustrated in FIG. 1 corresponds to an extreme case, but is should be noted that a slight misalignment of a nanotube or nanofiber relative to the hole (of the order of 100 nm) in the grid causes incorrect operation of the cathode (C. Xie et al., JVST B18, 1833 (2000)).

OBJECTS OF THE INVENTION

In this context, the invention proposes a novel process for the localized growth of nanotubes or nanofibers that allows the catalyst spots on which the nanotubes grow to be centered very accurately.

More precisely, the subject of the invention is a process for the controlled growth of nanotubes or nanofibers on a substrate, characterized in that it comprises:

- the production on the substrate of a bi-layer structure composed of a layer of catalyst material and a layer of associated material, said associated material being such that it forms a noncatalytic alloy with the catalyst material at high temperature, said bi-layer structure having at least one first aperture in the layer of associated material so as to locally constitute a structure consisting of a single layer of catalyst material;
- the annealing of the bi-layer structure at high temperature so as to form a single layer of a catalyst material/associated material alloy, said single layer of alloy having at least one second aperture so as to localize the catalyst material in this second aperture; and
- the growth of the nanotubes or nanofibers from the catalyst material localized in the second aperture.

According to the process of the invention, the first apertures and the second apertures may advantageously be self-aligned.

According to an alternative method of implementing the invention, the process comprises the deposition of the layer of associated material on the surface of the layer of catalyst material deposited beforehand, then the production of at least one first aperture in the layer of associated material.

According to another method of implementing the invention, the process comprises the deposition of the layer of associated material on the surface of the substrate; the production of at least one first aperture in the layer of associated material; and then the deposition of the layer of catalyst on the surface of the layer of associated material and in said first aperture.

According to one method of implementing the invention, the nanotubes or nanofibers are made of carbon, silicon or boron, or an alloy based on at least one of these elements and possibly containing nitrogen, the catalyst material possibly being of the nickel, cobalt, iron, platinum or yttrium type or made of any other alloy based on at least one of these elements, the associated material possibly being of the silicon type. The associated material is a material that is not a catalyst diffusion barrier.

Preferably, the process according to the invention includes the prior deposition of a catalyst diffusion barrier layer on the surface of the substrate.

The subject of the invention is also a process for fabricating a field-effect cathode, which comprises the localized nanotube growth process according to the invention.

More precisely this process comprises:
the production of a multilayer stack on a substrate, comprising:
  a bi-layer structure composed of a layer of catalyst material and a layer of associated material, said associated material being such that it forms an alloy with the catalyst material at high temperature,
  a thick layer of insulation and
  a conductive layer constituting the grid;
the anisotropic etching of the grid and the isotropic etching of the insulation;
the anisotropic etching of the layer of associated material, said operations of etching the grid and the associated material defining, respectively, at least one first aperture in the grid and at least one first aperture in the layer of associated material, said apertures being self-aligned;
the high-temperature annealing of the preformed assembly so as to form a single layer of a catalyst material/associated material alloy, said single layer of alloy having at least one second aperture so as to localize the catalyst material in the second aperture; and
the localized growth of the nanotubes from the catalyst material in the second aperture.

Yet another subject of the invention is a second field-emission cathode fabrication process, which comprises the localized nanotube growth process according to the invention.

More precisely, this process comprises the following steps:
the production of a multilayer stack on a substrate comprising:
  a layer of associated material, said associated material being such that it forms, at high temperature, an alloy with a catalyst material for catalyzing the growth of nanotubes or nanofibers,
  a thick layer of insulation and
  a conducting layer constituting the grid of the cathode;
the anisotropic etching of the grid and the isotropic etching of the insulation;
the anisotropic etching of the layer of associated material, said operations of etching the grid and the associated material defining, respectively, at least one first aperture in the grid and at least one first aperture in the layer of associated material, said apertures being self-aligned;
the deposition of a catalyst layer on the layer of associated material and in its aperture;
the high-temperature annealing of the preformed assembly so as to provide a single layer of a catalyst material/associated material alloy, said single layer of alloy having at least one second aperture so as to localize the catalyst material in this second aperture; and
the localized growth of the nanotubes or nanofibers from the catalyst material in the second aperture.

In these field-emission cathode fabrication processes, the second apertures are advantageously self-aligned with the first apertures.

Advantageously, the catalyst layer is deposited by uniform evaporation of catalyst material.

BRIEF DESCRIPTION OF THE DRAWINGS

The invention will be more clearly understood and other advantages will become apparent on reading the description that follows and examining the appended figures, in which.

DETAILED DESCRIPTION OF THE EMBODIMENT

In general, the present invention provides a novel process for localizing catalyst spots on a substrate. This novel process allows the fabrication of cathodes for which the nanotubes or nanofibers are self-aligned with the aperture in the extraction grid. For the target applications mentioned in the preamble of the present patent application, it will be advantageous to produce matrices of catalyst spots.

These catalyst spots precisely define the locations at which the nanotubes or nanofibers can be grown.

The basic principle of the invention is illustrated in FIG. 2 and in FIG. 3, which describe two alternative methods of implementing the invention, consisting either in depositing a layer of associated material on a layer of catalyst (FIG. 2) or in depositing a layer of catalyst on a layer of associated material that has been pre-etched (FIG. 3).

Figure 1A:
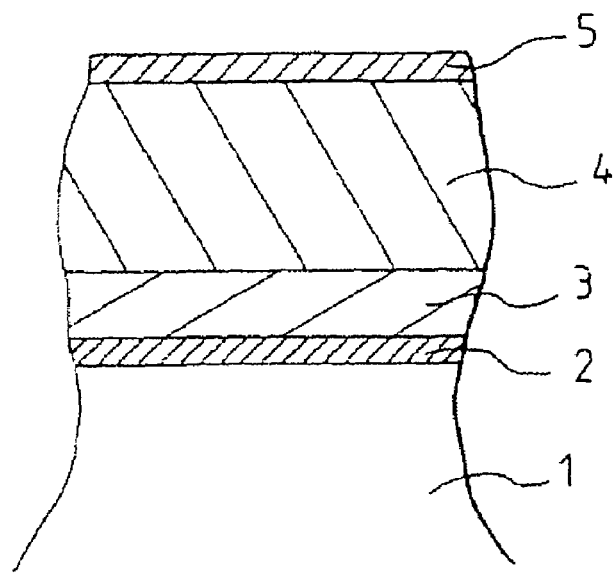
FIGS. 1a–1f illustrate a field-emission cathode fabrication process according to the known art.
Figure 1B:
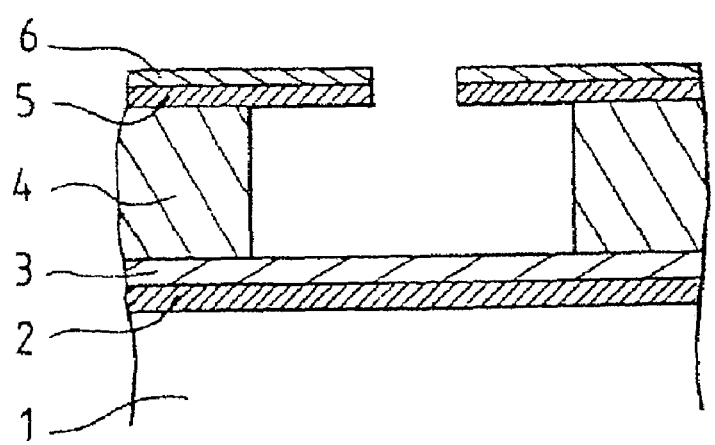
Figure 1C:
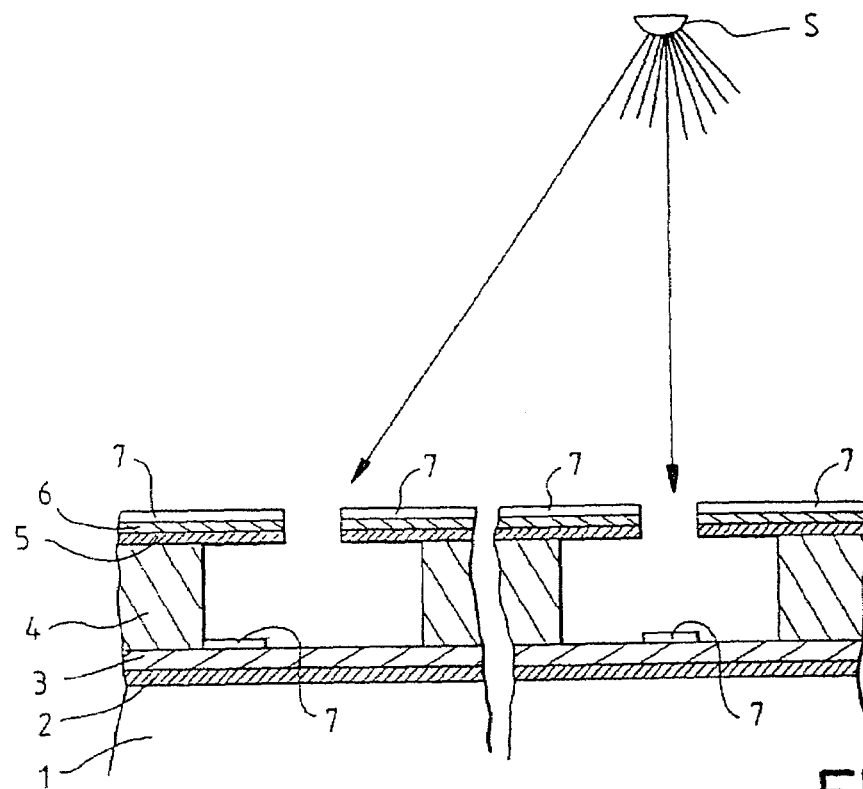
Figure 1D:
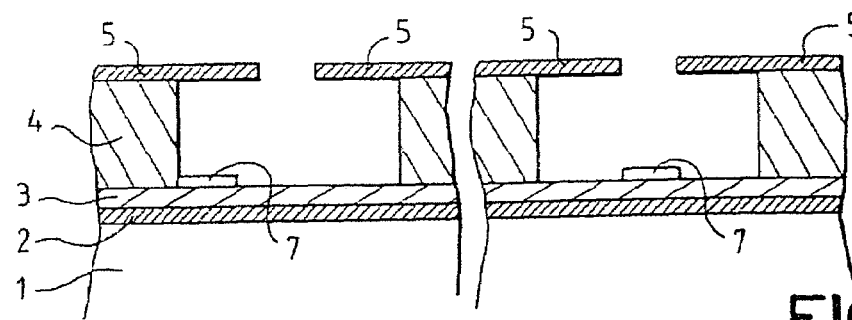
Figure 1E:
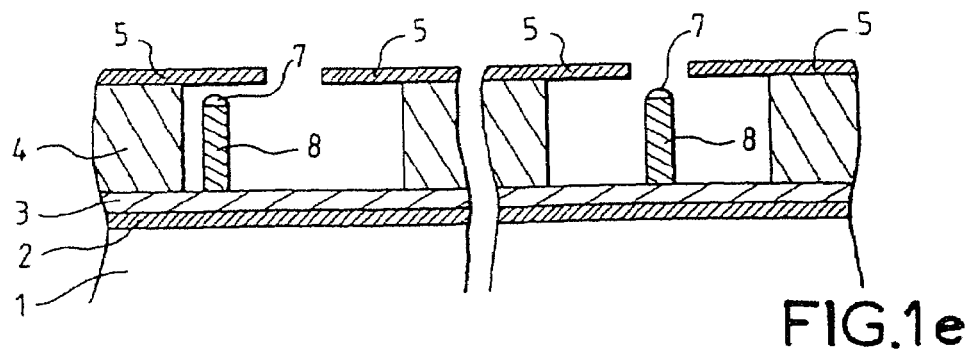
Figure 1F:
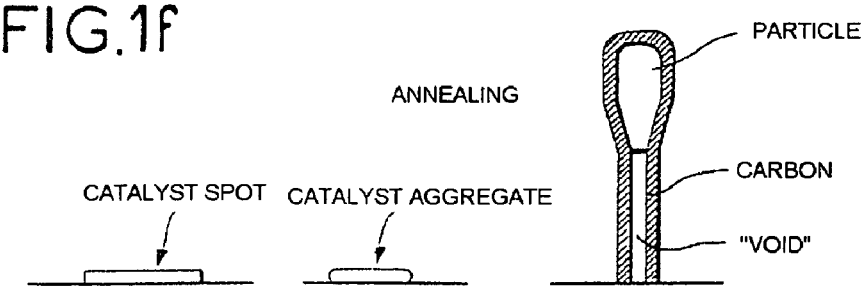
Figure 2A:
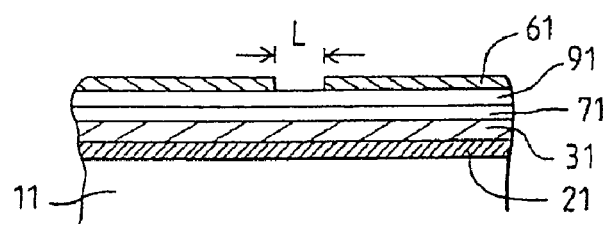
FIGS. 2a–2b illustrate the first steps of a first method of implementing the controlled nanotube or nanofiber growth process according to the invention.

We will now describe in detail below these two alternatives. According to the first alternative, the process as illustrated in FIG. 2a comprises the respective deposition, on a substrate 11, of a conducting layer 21, if the substrate is not conducting, a diffusion barrier layer 31, a layer of catalyst material 71, a layer of associated material 91 and then a layer of resin 61 by virtue of which it is possible to carry out lithography operations.

Thus, a lithography operation for producing a first aperture of dimension L, typically less than 300 nm, is carried out.

Figure 2B:
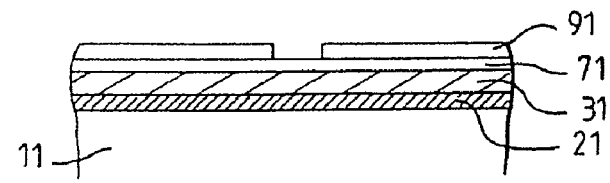

In a second step, illustrated in FIG. 2b, the layer of associated material 91 is selectively etched. Thus, a bi-layer structure 71, 91 having a first aperture of dimension L in the layer of associated material is obtained, locally exposing the layer of catalyst material 71.

Figure 3A:
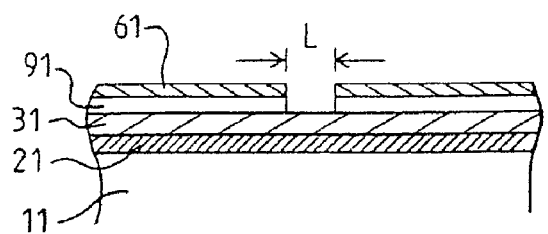
FIGS. 3a–3b illustrate the first steps of a second method of implementing the controlled nanotube or nanofiber growth process according to the invention.

According to another method of implementation illustrated in FIG. 3, a stack is firstly formed on top of a substrate 11, consisting of a conducting layer 21, a diffusion barrier layer 31, a layer of associated material 91 and then a layer of resin 61. The combination of layers 61 and 91 is then etched to produce a first aperture of dimension L within the layer of associated material 91 (FIG. 3a).

Figure 3B:
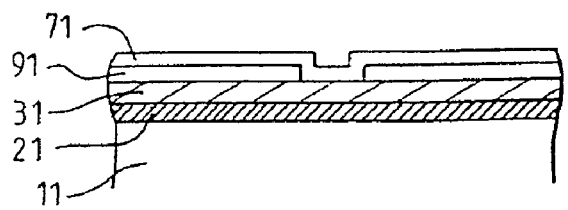

After removing the resin, a layer of catalyst material 71 is deposited (FIG. 3b). Again a bi-layer structure 91, 71 having a first aperture of dimension L within the layer of associated material is obtained, locally leaving a monolayer structure of catalyst material.

Figure 4A:
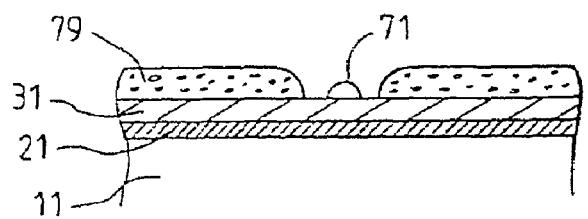
FIGS. 4a–4b illustrate steps common to the processes illustrated in FIG. 2 and FIG. 3, said steps being used in controlled nanotube or nanofiber growth processes according to the invention.

Whatever the method of implementation, the high-temperature annealing operation (illustrated in FIG. 4a) is carried out, which causes the formation of an associated material/catalyst material alloy 79 in the regions where the associated material 91 has not been etched. In the regions where only the single layer of catalyst material remains, an aggregate of pure catalyst material 71 of typically hemispherical shape is generated.

Figure 4B:
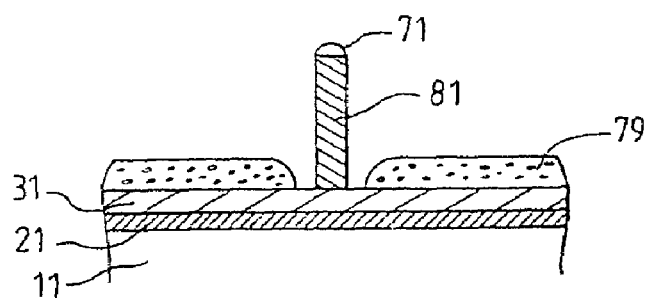
Figure 5:
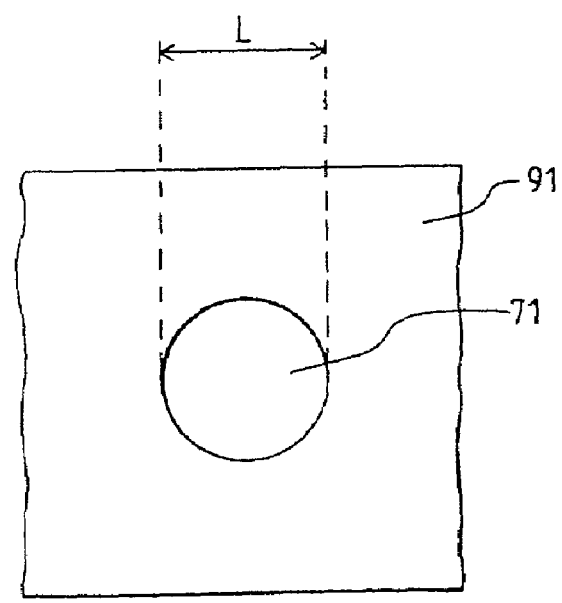
FIG. 5 illustrates a sectional view and a top view of a bi-layer structure according to the invention, before the catalyst material/associated material alloy has been formed.
Figure 5:
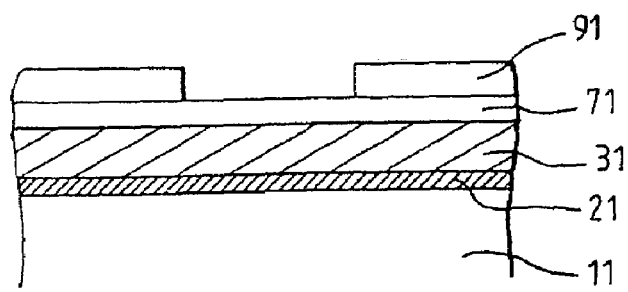
Figure 6:
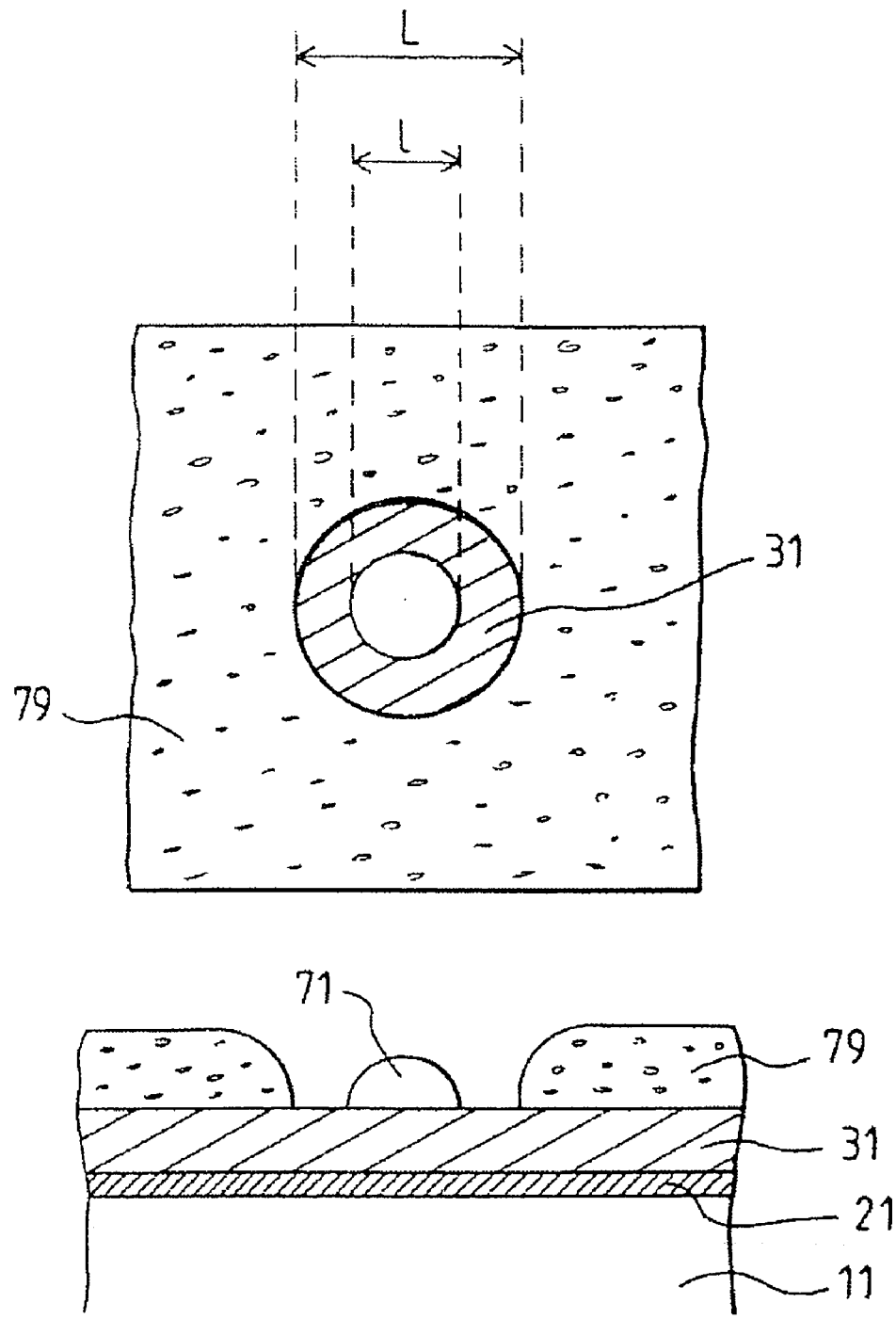
FIG. 6 illustrates a sectional view and a top view of a bi-layer structure according to the invention, after the catalyst material/associated material alloy has been formed.

Finally, the nanotubes 81 are grown at the position of the preformed aggregates of catalyst material (FIG. 4b). Thus, the process of the invention makes it possible to produce an aggregate size that is smaller than the aperture of dimension L made in the resin. FIGS. 5 and 6 illustrate this effect. FIG. 5 in fact shows a top view and a sectional view of a bi-layer structure having a first aperture of dimension L in the layer of associated material 91. FIG. 6 illustrates the same configuration after annealing and demonstrates the formation of the alloy that can generate a second aperture of dimension 1 smaller than the dimension L, and the creation of an aggregate of catalyst material 71. In comparison with the methods employed in the prior art, it is therefore possible to use, for equivalent aggregate size, a lithography machine of lower resolution (typically 300 nm instead of 100 nm). Of course, this size reduction is added to the size reduction effects due to the annealing before growth or to the growth mechanism that were described above.

If a number of atoms of associated material to number of atoms of catalyst material ratio greater than that corresponding to the composition of the associated material/catalyst material alloy, at equilibrium and at the thermal annealing temperature, is chosen, then the catalyst material will diffuse to the outside so as to react with the excess associated material. An aggregate of diameter smaller than that of the pattern written into the resin is therefore obtained. The reduction effect depends on the excess associated material, the heat treatment temperature and the treatment time.

In the case of Ni, Fe and Co catalysts, it is possible to use, for example, silicon as associated material, this material having the advantage of being well known to those skilled in the art. The annealing carried out before nanotube/nanofiber growth will force the formation of a silicide $ASi_x$, when A corresponds to the catalytic material. For the growth temperatures (600 to 800° C.) that are generally used and for thin (~100 nm) Si and catalyst films, x may typically vary from 1 to 2. To give a simple example, let us assume that an annealing operation for forming the stable alloy $CoSi_2$, $NiSi_2$ or $FeSi_2$ is carried out. Any lateral diffusion can then be prevented if the thickness of the catalyst and Si layers are such that the number of Si atoms to the number of A atoms ratio is equal to 2. In contrast, if this ratio is increased, lateral diffusion of the catalyst will occur so as to form the stable alloy. Such diffusion will depend not only on the value of this ratio, the annealing temperature and the annealing time, but also on the ease with which the catalyst diffuses into the subjacent material.

The catalyst materials are chosen according to the nature of the nanotubes or nanofibers that it is desired to grow. Typically for carbon nanotubes, the catalyst material may be nickel, cobalt or iron, while for silicon nanotubes or nanofibers, the catalyst material may be gold, cobalt or iron.

The associated material, for forming an alloy with the catalyst material at high temperature, must not constitute a diffusion barrier for this catalyst. Many materials may be suitable, especially silicon.

The constituent materials of the diffusion barrier layer (material labeled 31) may advantageously be of the TiN type or, in a conventional way, $SiO_2$. In the latter case, a very small thickness will be chosen so as to promote conduction via the tunnel effect (typically a thickness of less than around 10 nanometers) which would not prevent field emission in the case of applications of the field-emission cathode type.

In practice, the insulating properties of this layer are rapidly degraded by the current flow during electron emission.

DESCRIPTION OF THE PREFERRED EMBODIMENT

We will now describe below a first example of a process according to the invention for fabricating a self-aligned field-emission cathode, the steps of which are illustrated by FIGS. 7a to 7e.

Firstly, the following multilayer stack is produced on a substrate 11:

a conducting layer 21;
a catalyst material diffusion barrier layer 31;
a layer of catalyst material 71;
a layer of associated material 91;
a thick layer of insulation 41;
a conducting layer constituting the grid 51; and
a layer of resin 61.

Figure 7A:
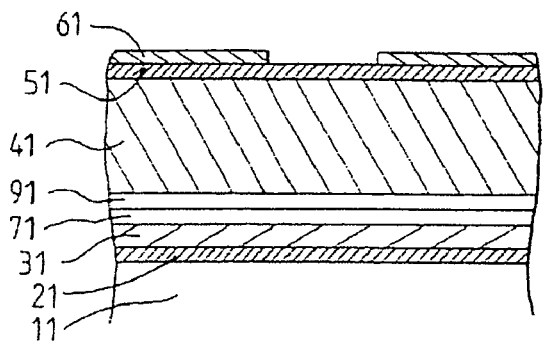
FIGS. 7a–7e illustrate the steps of a first method of implementing the field-effect cathode fabrication process according to the invention.
Figure 7B:
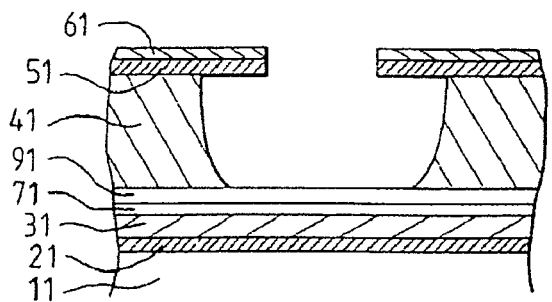

A first aperture having a dimension of less than about 300 mm is then obtained by lithography in the resin (FIG. 7a).

Next, the extraction grid, which is a conducting film, is anisotropically etched and the insulation (which may be $SiO_2$ is isotropically etched by chemical etching (FIG. 7b) which results in undercutting (concave sidewalls) of said insulation.

Figure 7C:
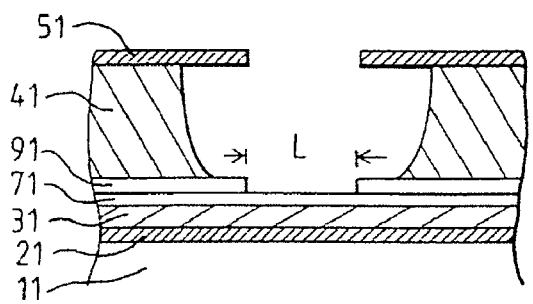

Next, the associated material 91, self-aligned with the aperture in the resin and with the extraction grid, is anisotropically etched (FIG. 7c). This operation may be carried out by reactive ion etching in a reactor maintained at low pressure (typically less than 10 mTorr) under conditions well known to those skilled in the art. Because of its operating principle, this type of reactor makes it possible to achieve an ion flux that is perfectly perpendicular to the substrate and to do so over large areas.

It should be noted that the aperture in the extraction grid may be enlarged if it is etched isotropically. This operation does not modify the diameter of the aperture in the associated material 91 since its diameter is set by the diameter of the aperture in the resin.

Figure 7D:
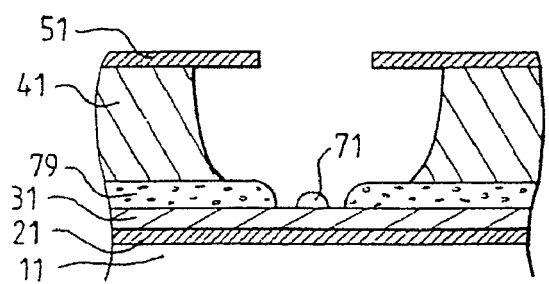
Figure 7E:
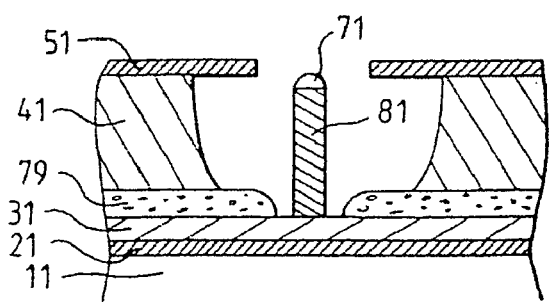

Next, the thermal annealing operation is carried out, allowing the formation of the associated material/catalyst material alloy 79 and the formation of an aggregate of pure catalyst material (FIG. 7d). Thus, it is possible to grow nanotubes or nanofibers 81 that are perfectly aligned with the aperture in the extraction grid (FIG. 7e).

According to a second example of a self-aligned field-emission cathode fabrication process according to the invention, the following multilayer stack is firstly produced on the substrate 11:

a conducting layer 21;
a catalyst material diffusion barrier layer 31;
a layer of catalyst material 91;
a thick layer of insulation 41;
a conducting layer constituting the extraction grid 51; and
a layer of resin 61.

Figure 8A:
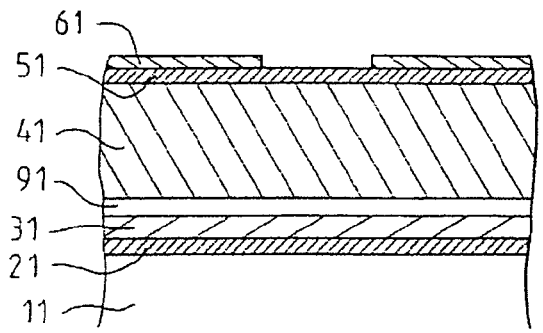
FIGS. 8a–8e illustrate the steps of a second method of implementing the field-emission cathode fabrication process according to the invention.

Next, a first aperture is obtained by lithography in the resin (FIG. 8*a*).

Figure 8B:
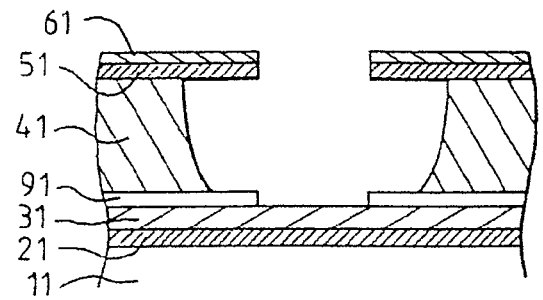

The grid is etched anisotropically and the insulation is etched isotropically. Next, the associated material 91 self-aligned with the aperture in the resin is etched anisotropically (FIG. 8*b*).

Figure 8C:
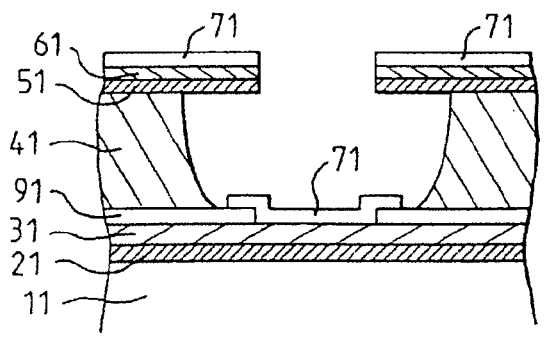

A layer of catalyst material 71 is then deposited by evaporation of said catalyst material. During this operation, various rotations of the sample holder relative to the evaporation source may be carried out. Such a process produces a uniform coating with a dimension greater than the aperture in the resin and thus makes it possible to form, locally, a bi-layer structure that will subsequently allow the formation of the alloy (FIG. 8*c*). The resin is then removed by a conventional lithography step, which involves the elimination of the upper layer of catalyst material above said resin.

Figure 8D:
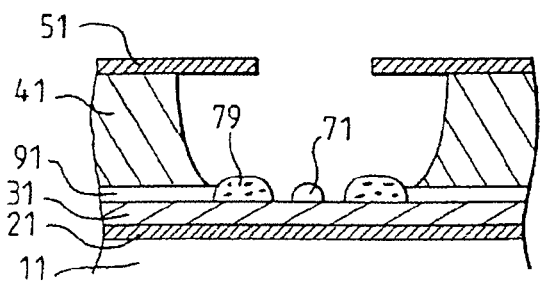

Next, the high-temperature annealing is carried out in order to form the associated material/catalyst material alloy 91/79 and an aggregate of catalyst material within the aperture in the material 91 (FIG. 8*d*).

Figure 8E:
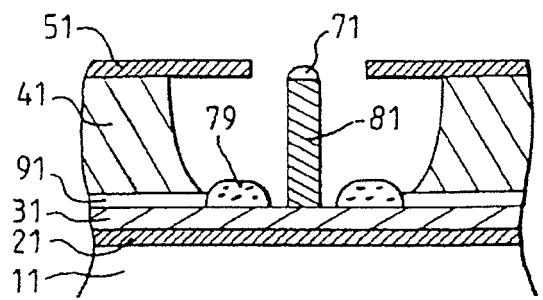

The nanotubes or nanofibers 81 can then be grown so as to be perfectly self-aligned with the extraction grid (FIG. 8*e*).

The invention claimed is:

1. A process for the controlled growth of nanotubes or nanofibers on a substrate, comprising the steps of:
    producing on the substrate a bi-layer structure composed of a layer of catalyst material and a layer of associated material, the associated material forming a noncatalytic alloy with the catalyst material at high temperature, the bi-layer structure having a first aperture in the layer of associated material to locally constitute a structure having of a single layer of catalyst material wherein said layer of catalyst material is composed of catalyst spots;
    annealing the bi-layer structure at high temperature to form a single layer of a catalyst material/associated material alloy, the single layer of alloy having a second aperture to localize the catalyst material in this second aperture; and
    growing the nanotubes or nanofibers from the catalyst material localized in the second aperture in locations of said catalyst spots,
    wherein the catalyst material is localized in the second aperture in the same plane as that of the single layer.

2. The process according to claim 1, wherein the first apertures and the second apertures are self-aligned.

3. The process according to claim 1, comprising the steps of:
    depositing the layer of associated material on the surface of the layer of catalyst material; and
    producing a first aperture in the layer of associated material.

4. The process according to claim 1, comprising the steps of:
    depositing the layer of associated material on the surface of the substrate;
    producing at least one first aperture in the layer of associated material; and
    depositing the layer of catalyst on the surface of the layer of associated material and in said first aperture.

5. The process according to claim 1, comprising a prior deposition of a catalyst diffusion barrier layer on the substrate.

6. The process according to claim 1, wherein the constituent material of the nanotubes or nanofibers is of a carbon, silicon or boron type or is made of any alloy based on at least one of these elements and possibly containing nitrogen.

7. The process according to claim 1, wherein the catalyst material is of the nickel, cobalt, iron, platinum or yttrium type or made of any alloy based on at least one of these elements.

8. The process according to claim 1, wherein the associated material is silicon.

9. A process for fabricating a field-emission cathode, comprising the steps of:
    producing a multilayer stack on a substrate, comprising:
    a bi-layer structure composed of a layer of catalyst material and a layer of associated material, the associated material being such that it forms an alloy with the catalyst material at high temperature,
    a thick layer of insulation and
    a metal layer constituting the grid;
    etching of the grid and isotropic etching of the insulation;
    etching of the layer of associated material, said etching defining at least one first aperture in a grid and at least one first aperture in the layer of associated material, the apertures being self-aligned;
    at high-temperature annealing of the preformed assembly so as to form a single layer of a catalyst material/associated material alloy, the single layer of allay having at least one second aperture; and
    growing locally the nanotubes from the catalyst material in the second aperture,
    wherein the catalyst material is localized in the second aperture in the same plane as that of the single layer.

10. A process for fabricating a field-emission cathode, comprising the steps of:
    producing a multilayer stack on a substrate comprising:
    a layer of associated material, the associated material being such that it forms, at high temperature, an alloy with a catalyst material for catalyzing the growth of nanotubes,
    a thick layer of insulation, and
    a conducting layer constituting the grid of the cathode;
    anisotropic etching of the grid and isotropic etching of the insulation;
    said anisotropic etching defining a first aperture in a grid and a first aperture in the layer of associated material, said apertures being self-aligned;
    depositing a catalyst layer on the layer of associated material and in its aperture;
    at high-temperature annealing of the preformed assembly so as to provide a single layer of a catalyst material/associated material alloy, the single layer of alloy having a second aperture so as to localize the catalyst material in this second aperture; and
    growing locally the nanotubes from the catalyst material in the second aperture,
    wherein the catalyst material is localized in the second aperture in the same plane as that of the smale layer.

11. The process according to claim 9, comprising the steps of depositing the catalyst layer by uniform evaporation.

12. The process according to claim 9, wherein the first and second apertures are self-aligned.

13. The process according to claim 9, comprising the steps of depositing a conducting layer on the substrate.

14. The process according to claim 9, comprising the steps of depositing a catalyst diffusion barrier layer on the substrate.

15. The process according to claim 9, wherein the constituent material of the nanotubes or nanofibers is of the carbon, silicon or boron type or made of any alloy based on at least one of these elements and possibly containing nitrogen.

16. The process according to claim 9, wherein the catalyst material is of the nickel, cobalt, iron, platinum or yttrium type or made of any alloy based on at least one of these elements.

17. The process according to claim 9, wherein the associated material is of the silicon type.

18. The process according to claim 1, wherein said catalyst spot is a performed aggregate of catalyst material.

19. The process according to claim 1, wherein each of said nanotubes or nanofibers is grown at a catalyst spot.

20. The process according to claim 18, wherein each of said nanotubes or nanofibers is grown at the position of the preformed aggregate of catalyst material.

21. The process according to claim 19, wherein each of said nanotubes or nanofibers is smaller than an associated first aperture.

\* \* \* \* \*